United States Patent

[11] 3,623,996

| [72] | Inventor | Robert L. Amster<br>New York, N.Y. |
|---|---|---|
| [21] | Appl. No. | 838,171 |
| [22] | Filed | July 1, 1969 |
| [45] | Patented | Nov. 30, 1971 |
| [73] | Assignee | GTE Laboratories Incorporated |

[54] STRONTIUM THIOGALLATE PHOSPHORS COACTIVATED BY CERIUM AND NEODYMIUM
12 Claims, 1 Drawing Fig.

| [52] | U.S. Cl. | 252/301.4 S |
|---|---|---|
| [51] | Int. Cl. | C09k 1/12 |
| [50] | Field of Search | 252/301.4 S |

[56] References Cited
UNITED STATES PATENTS

| 2,947,704 | 8/1960 | Apple | 252/301.6 S |
|---|---|---|---|
| 2,947,705 | 8/1960 | Apple | 252/301.6 S |

*Primary Examiner*—Robert D. Edmonds
*Attorney*—Irving M. Kriegsman

ABSTRACT: A short-persistence phosphor consisting of strontium thiogallate coactivated by cerium and neodymium. This phosphor is cathodoluminescent and is suitable for use in short-persistence cathode-ray tubes. Strontium thiogallate singly activated by neodymium is also disclosed.

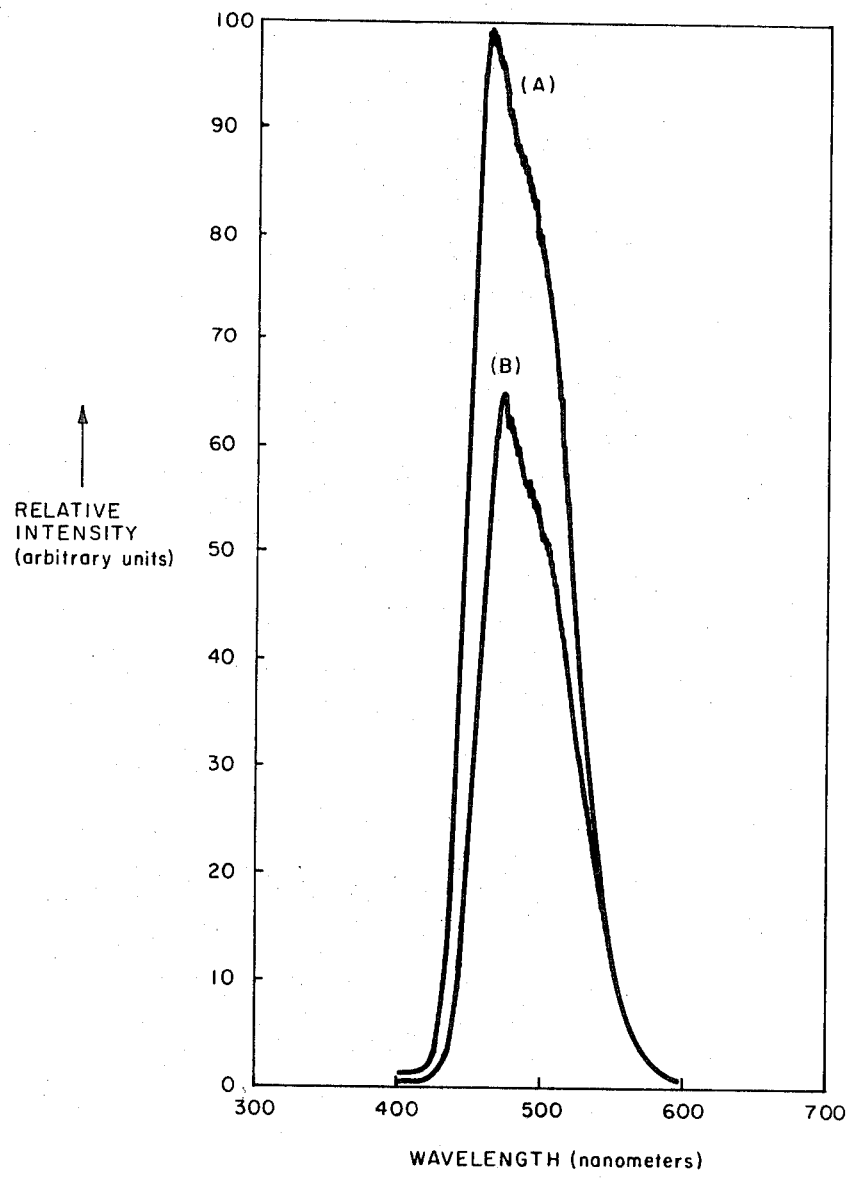

STRONTIUM THIOGALLATE PHOSPHORS COACTIVATED BY CERIUM AND NEODYMIUM

BACKGROUND OF THE INVENTION

This invention relates to short-persistence fluorescent materials which emit light when exposed to ultraviolet or electron radiation. In particular, it relates to the phosphor strontium thiogallate coactivated by cerium and neodymium.

The phosphor strontium thiogallate activated by cerium id disclosed in the copending U.S. Pat. application Ser. No. 838,065 of Thomas E. Peters, filed of even date herewith and assigned to applicant's assignee. As pointed out in the referenced application, cerium-activated strontium thiogallate is a short-persistence cathodoluminescent phosphor which is suitable for use in short-persistence cathode-ray tubes such as flying-spot scanner tubes. When this phosphor is excited by cathode rays its emission decays to 1 percent of initial brightness in about 1 to 1½ microseconds after the exciting stimulus is removed. The actual decay time is found to be dependent upon the cerium concentration of the phosphor, but, regardless of concentration, cerium-activated strontium thiogallate has been found to require at least about 1 microsecond to decay to 1 percent of its initial brightness. While this decay time is fast as compared to most cathodoluminescent phosphors, it is desirable for certain applications to have a phosphor which decays to 1 percent of initial brightness in substantially less than 1 microsecond.

SUMMARY OF THE INVENTION

I have discovered that when neodymium is added to cerium-activated strontium thiogallate the decay time of the cerium emission after removal of an exciting cathode ray stimulus is significantly shortened. Further, when strontium thiogallate is singly activated with neodymium, a phosphor is obtained which emits radiation in the yellow region of the spectrum when excited by cathode rays. More specifically, the present invention relates to phosphors which can be represented by the general formula $$Sr_{1-(x+y)}Ga_2S_4:Ce_x^{3+}Nd_y^{3+}$$

where $x$ and $y$ are values selected to produce luminescence when the phosphor composition is exposed to incident radiation, with $y$ being a value greater than zero and $x$ allowed to take on the value zero. Since trivalent ions are not known to substitute for divalent ions without some mechanism for balancing the electronic charge, charge compensation must inherently occur, probably by the formation of lattice vacancies.

A charge-compensating ion such as sodium can be used to compensate for the excess positive charge introduced when the trivalent rare earth ions ($Ce^{3+}$ and $Nd^{3+}$) are substituted for divalent strontium. When sodium compensation is used, a phosphor is obtained which can be represented by the general formula

$$Sr_{1-2(x+y)}Ga_2S_4Na_{x+y}^+:Ce_x^{3+}Nd_y^{3+}.$$

These sodium-compensated phosphors are brighter than their uncompensated counterparts having the same $Ce^{3+}$ and $Nd^{3+}$ concentrations.

The phosphor strontium thiogallate singly activated by cerium is found to have a decay time which shortens as the cerium concentration is increased over the range of 1 to 20 percent. When neodymium is added to a strontium thiogallate phosphor of given cerium concentration, the decay time of the cerium emission decreases as the neodymium concentration is increased. Thus, for example, the phosphor  $Sr_{0.76}Ga_2S_4Na_{0.12}^+:Ce_{0.12}^{3+}Ga$ has blue emission which decays to 1 percent of initial brightness in 1.05 microseconds, whereas the blue emission of the phosphor $Sr_{0.75}Ga_2S_4Na_{0.125}^+:Ce_{0.12}^{3+}Nd_{0.005}^{3+}$ decays to 1 percent of initial brightness in only 0.68 microsecond. This decrease in the decay time is believed due to the quenching of $Ce^{3+}$ emission by $Nd^{3+}$ which results from nonradiative energy transfer from $Ce^{3+}$ to $Nd^{3+}$. The amount of neodymium in the coactivated phosphor is, however, limited by the diminution of intensity of the $Ce^{3+}$ emission which accompanies increases in the $Nd^{3+}$ concentration. To illustrate, in the above example the coactivated phosphor $Sr_{0.75}Ga_2S_4Na_{0.125}^+:Ce_{0.12}^{3+}Nd_{0.005}^{3+}$ is found to be only 60 percent as bright as the singly activated $Sr_{0.76}Ga_2S_4Na_{0.12}^+:Ce_{0.12}^{3+}$. The choice of $Nd^{3+}$ concentration is, therefore, ultimately a compromise between the desired decay time and the desired intensity of the $Ce^{3+}$ emission.

When strontium thiogallate is singly activated by neodymium ($x=0$ in either of the above general formulas), the resulting material emits radiation in the yellow region of the spectrum when excited by cathode rays. This phosphor also emits in the infrared when excited by ultraviolet radiation.

EXAMPLE 1

2.18 g. of SrS and 4.71 g. of $Ga_2S_3$ were dry-blended with 0.30 g. of $Ce_2S_3$ and 0.02 g. of $Nd_2S_3$. The blend was fired in an $H_2S$ atmosphere for 2 hours at a temperature of 950° C. The resultant solid product was ground to insure a homogeneous blend and refired in an $H_2S$ atmosphere for 1 hour at 950° C. The resultant phosphor $Sr_{0.915}Ga_2S_4:Ce_{0.08}^{3+}Nd_{0.005}^{3+}$ possessed a yellow body color and exhibited a bright blue emission under both ultraviolet and cathode-ray excitation.

EXAMPLE 2

Additional samples were prepared of phosphor compositions having the formula $Sr_{1-(x+y)}Ga_2S_4:Ce_x^{3+}Nd_y^{3+}$ in which $x$ was varied between 0.01 and 0.20 and $y$ was varied between 0.0025 and 0.01. In all cases blue-emitting phosphors were obtained. The blue emission intensities of phosphors having the same cerium concentration was found to decrease as the neodymium concentration was increased. This quenching of the cerium emission by neodymium was therefore indicated.

EXAMPLE 3

A phosphor was prepared by the same method as used in example 1 except that 2.14 g. of SrS and 4.71 g. of $Ga_2S_3$ were dry-blended with 0.153 g. of $Ce_2S_3$, 0.02 g. of $Nd_2S_3$ and 0.054 g. of NaCl. The resultant sodium compensated phosphor $Sr_{0.91}Ga_2S_4Na_{0.045}^+:Ce_{0.04}^{3+}Nd_{0.005}^{3+}$ exhibited bright blue emission under both ultraviolet and cathode-ray excitation and was almost twice as bright as its uncompensated counterpart of example 2.

The cathodoluminescent emission spectrum of coactivated $Sr_{0.91}Ga_2S_4Na_{0.045}^+:Ce_{0.04}^{3+}Nd_{0.005}^{3+}$ is shown in the drawing (curve B) and compared to the emission of singly activated phosphor $Sr_{0.92}Ga_2S_4Na_{0.04}^+:Ce_{0.04}^{3+}$ (curve A). It is seen that the addition of neodymium acts to quench the cerium emission. The addition of neodymium, however, also serves to shorten the phosphor persistence. The coactivated phosphor required only 0.76 microsecond to decay to 1 percent of initial brightness whereas the singly activated phosphor required 1.15 microseconds to decay to this level.

EXAMPLE 4

Additional samples were prepared of phosphor compositions having the formula $Sr_{1-2(x+y)}Ga_2S_4Na_{x+y}^+:Ce_x^{3+}Nd_y^{3+}$ in which $x$ was varied between 0.01 and 0.20 and $y$ was varied between 0.0025 and 0.01. In all cases the addition of neodymium was found to shorten the persistence and decrease the brightness of the phosphor in question. The table below indicates the persistence and relative brightness of the blue emission of some of the samples of this example as compared to singly activated phosphors.

| Phosphor | Relative brightness (arbitrary units) | Decay time [1] |
|---|---|---|
| $Sr_{0.76}Ga_2S_4Na_{0.12}^+:Ce_{0.12}^{3+}$ | 100 | 1.05 |
| $Sr_{0.75}Ga_2S_4Na_{0.125}^+:Ce_{0.12}^{3+}Nd_{0.005}^{3+}$ | 60 | 0.68 |
| $Sr_{0.74}Ga_2S_4Na_{0.13}^+:Ce_{0.12}^{3+}Nd_{0.01}^{3+}$ | 45 | 0.66 |
| $Sr_{0.92}Ga_2S_4Na_{0.04}^+:Ce_{0.04}^{3+}$ | 94 | 1.15 |
| $Sr_{0.91}Ga_2S_4Na_{0.045}^+:Ce_{0.04}^{3+}Nd_{0.005}^{3+}$ | 54 | 0.76 |

[1] percent of initial brightness (microseconds).

EXAMPLE 5

A phosphor was prepared by the same method as used in example 1 except that 2.30 g. of SrS and 4.71 g. of $Ga_2S_3$ were dry-blended with 0.08 g. of $Nd_2S_3$ and 0.024 g. of NaCl. The resultant phosphor $Sr_{0.96}Ga_2S_4Na_{0.02}^+:Nd_{0.02}^{3+}$ exhibited infrared emission and moderate yellow emission having bands peaking at about 542 and 595 nanometers when excited by cathode rays. This phosphor was found to exhibit emission in the infrared when excited by ultraviolet light. Infrared emission lying between 870 and 920 nanometers was observed when the phosphor was excited at excitation bands having peaks at about 412 and 325 nanometers.

What is claimed is:

1. A phosphor composition defined by the formula $Sr_{1-(x+y)}Ga_2S_4:Ce_x^{3+}Nd_y^{3+}$ wherein $x$ and $y$ are values selected to produce luminescence when said phosphor is exposed to incident radiation, said $y$ value being greater than zero, said phosphor being charge compensated.

2. The phosphor composition as defined by claim 1 wherein $x$ has the approximate range 0.01 to 0.02 gram-atom per mole and $y$ has the approximate range 0.0025 to 0.01 gram-atom per mole.

3. The phosphor composition as defined by claim 2 wherein $x$ is about 0.08 gram-atom per mole and $y$ is about 0.005 gram-atom per mole.

4. A phosphor composition defined by the formula $Sr_{1-2(x+y)}Na_{x+y}Ga_2S_4:Ce_x^{3+}Nd_y^{3+}$ wherein $x$ and $y$ are values selected to produce luminescence when said phosphor is exposed to incident radiation, said $y$ value being greater than zero.

5. The phosphor composition as defined by claim 4 wherein $x$ has the approximate range 0.01 to 0.02 gram-atom per mole and $y$ has the approximate range 0.0025 to 0.01 gram-atom per mole.

6. The phosphor composition as defined by claim 5 wherein $x$ is about 0.12 gram-atom per mole and $y$ is about 0.005 gram-atom per mole.

7. A phosphor composition consisting essentially of $SrGa_2S_4$ coactivated by trivalent cerium and trivalent neodymium.

8. The phosphor composition as defined by claim 7 wherein said trivalent coactivators are charge compensated.

9. The phosphor composition as defined by claim 8 wherein said trivalent coactivators are charge compensated by sodium.

10. A phosphor composition defined by the formula $Sr_{1-2y}GaS_4Na_y^+:Nd_y^{3+}$ wherein $y$ is a value selected to produce luminescence when said phosphor composition is exposed to incident radiation, said $y$ value being greater than zero.

11. The phosphor composition as defined by claim 10 wherein $y$ is about 0.02 gram-atom per mole.

12. A phosphor composition consisting essentially of $SrGa_2S_4$ activated by trivalent neodymium.

* * * * *